(12) United States Patent
Barnum et al.

(10) Patent No.: US 7,363,442 B2
(45) Date of Patent: Apr. 22, 2008

(54) SEPARATE HANDLING OF READ AND WRITE OF READ-MODIFY-WRITE

(75) Inventors: Melissa Ann Barnum, Kasson, MN (US); Paul Allen Ganfield, Rochester, MN (US); Lonny Lambrecht, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 10/988,314

(22) Filed: Nov. 12, 2004

(65) Prior Publication Data

US 2006/0107003 A1    May 18, 2006

(51) Int. Cl.
*G06F 12/00* (2006.01)
(52) U.S. Cl. .................. 711/155; 711/105; 711/167; 365/189.05; 710/52
(58) Field of Classification Search .............. None
See application file for complete search history.

(56) References Cited

U.S. PATENT DOCUMENTS 6,101,614 A * 8/2000 Gonzales et al. ............ 714/6
6,370,611 B1 * 4/2002 Callison et al. ............ 711/105
6,718,444 B1 * 4/2004 Hughes ...................... 711/155
6,973,551 B1 * 12/2005 Walton ....................... 711/155
2005/0080953 A1 * 4/2005 Oner et al. .................. 710/52
2006/0080589 A1 * 4/2006 Holm et al. ................ 714/763

* cited by examiner

*Primary Examiner*—Jasmine Song
(74) *Attorney, Agent, or Firm*—Francis Lammes; Stephen J. Walder, Jr.; D'Ann N. Rifai

(57) ABSTRACT

A method, an apparatus, and a computer program are provided for the separate handling of read and write operations of Read-Modify-Write Commands in an XDR™ memory system. This invention allows the system to issue other commands between the reads and writes of a RMW. This insures that the dataflow time from read to write is not a penalty. A RMW buffer is used to store the read data and a write buffer is used to store the write data. A MUX is used to merge the read data and the write data, and transmit the merged data to the target DRAM via the XIO. The RMW buffer can also be used for scrubbing commands.

2 Claims, 3 Drawing Sheets

US 7,363,442 B2

SEPARATE HANDLING OF READ AND WRITE OF READ-MODIFY-WRITE

FIELD OF THE INVENTION

The present invention relates generally to Read-Modify-Write commands in XDR™ memory systems, and more particularly, to the separate handling of read and write operations to reduce down time during Read-Modify-Write operations.

DESCRIPTION OF THE RELATED ART

An Extreme Data Rate (XDR™) memory system includes three primary semiconductor components: a memory controller, at least one XDR™ IO Cell (XIO), and XDR™ DRAMs, available from Rambus, Inc., 4440 El Camino Real, Los Altos, Calif. 94022. With XDR™ DRAMs, the data transfer rate to and from memory has been dramatically increased. Conventional RMW operations consist of an activate, read, write, precharge sequence. One problem with the XDR™ memory system is that the read operation to write operation dataflow time in a Read-Modify-Write (RMW) operation causes a delay.

The DRAM read and write operations are inherently a fixed length, which is typically the size of a cacheline. When a read command for a read of a smaller length comes into the memory controller, a cacheline of data can be read from the DRAMs and the requested data can be sent on the system bus without any problems. However, the DRAMs cannot handle a write operation of a smaller length than a cacheline. In the situation where the write is of a smaller length than a cacheline a RMW can be used. For a RMW operation the target cacheline from the DRAM is read and stored in a buffer. Subsequently, the new write data is transmitted to the DRAM along with the rest of the data that was read from the DRAM. A MUX handles the process of merging the new data and the old data for the write to the DRAM. The end result is that a full cacheline of data is written into the DRAM. The problem is that the dataflow time between a read and a write in the XDR™ memory system causes a delay penalty.

SUMMARY OF THE INVENTION

The present invention provides a method, an apparatus, and a computer program for the separate handling of read and write operations of RMW commands in an XDR™ memory system. In an XDR™ memory system the conventional method of RMW causes delay because the read to write dataflow time is too long. The present invention avoids the dataflow delay time by separately handling the reads and writes of the RMW operation. A RMW operation is necessary when a write command is received that is smaller than a cacheline.

For this RMW operation, a read of a cacheline from the target XDR™ DRAM is accomplished and stored in a RMW buffer. Independently, the write data for the RMW operation is stored in a write buffer. An arbiter determines when to issue the write command to the XDR™. The read data and the write data are merged together by a multiplexer (MUX), and then the merged data is written to the target XDR™ DRAM. Since the read operation and the write operation are handled separately, other commands can be executed between the reads and writes of RMW operations and dataflow time is not a penalty. The RMW buffer can also be used for scrubbing. After a scrub command the target data can be stored in the RMW buffer and checked for errors.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in block diagram or flow chart form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

Read-modify-write (RMW) commands are accomplished by the memory controller in conjunction with the XIO. The memory controller issues the necessary commands to the XIO, including read and write commands. The conventional RMW method is an activate, read, write, precharge sequence, where the time between the read and write is determined by the DRAMs' capability. The dataflow time between a read and a write in a conventional RMW requires more time than the XDR™ DRAM minimum between normal read and write commands. Dataflow time can be described as the delay involved with being able to retrieve the data from the read operation in order to send it back to the XDR™ via the XIO for the write operation. This modified RMW method allows other commands to be issued between the read and write of the RMW so that time is not wasted due to the dataflow delay time.

Figure 1:
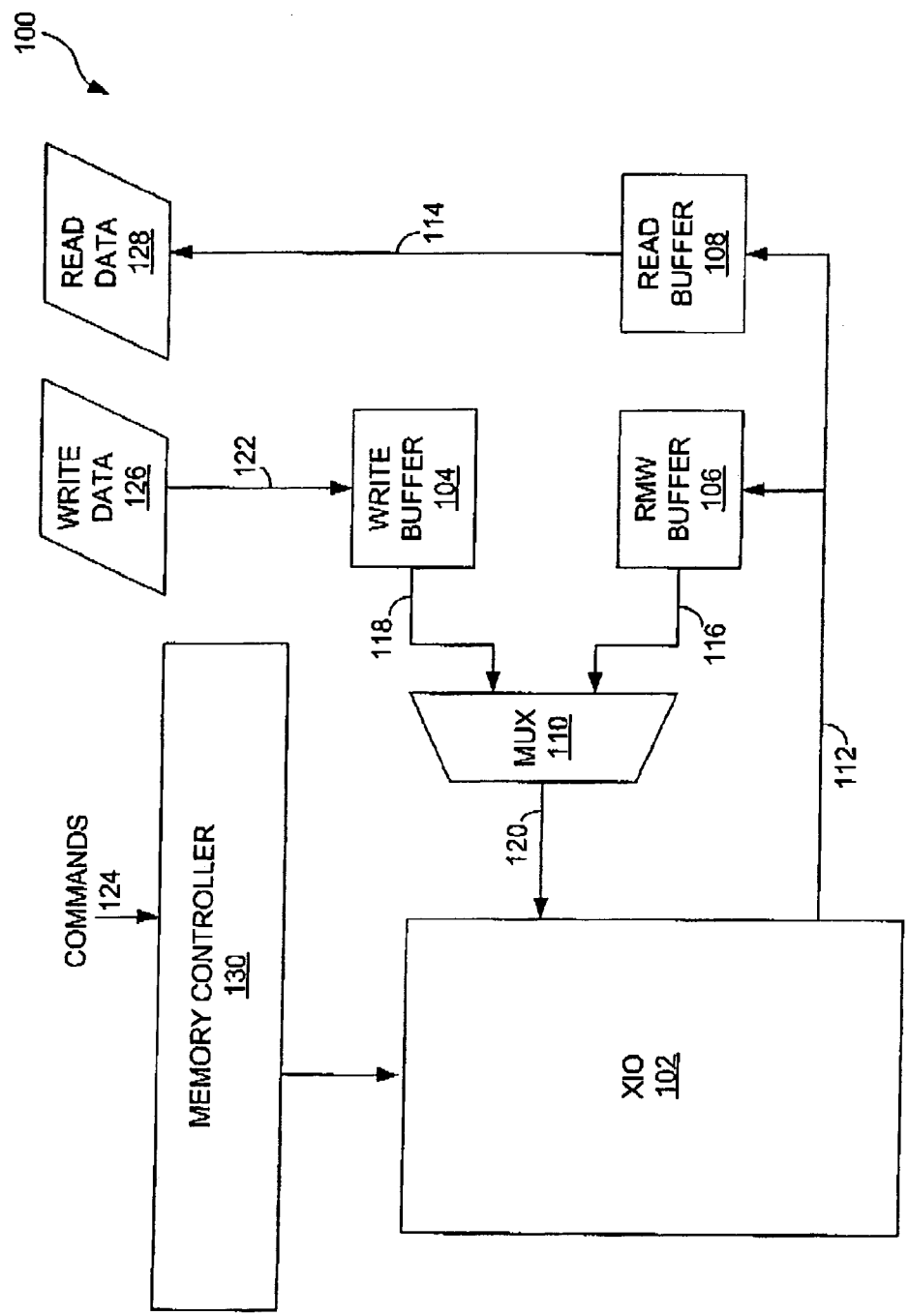
FIG. 1 is a block diagram illustrating an apparatus designed to accomplish modified Read-Modify-Write (RMW) operations in an XDR™ memory system.

Referring to FIG. 1 of the drawings, reference numeral 100 illustrates an apparatus designed to accomplish modified RMW operations in an XDR™ memory system. The XIO 102 retrieves and transmits data to and from the DRAMs. The memory controller 130 controls the XIO by receiving commands 124 and issuing them to the XIO 102. For a normal read operation the memory controller 130 receives a read command 124, and issues that command to the XIO 102. Then the XIO 102 retrieves the information from the DRAMs and sends the data on a bus 112 to be stored in a read buffer 108. The data is stored in the read buffer 108 and then sent out on another bus 114 as the read data 128. Then, the read data 128 travels to the area where the data was requested. For a normal write operation the memory controller 130 receives a write command 124 and issues that command to the XIO 102. The XIO 102 retrieves the write data 126. The write data 126 is sent on a bus 122 and stored in the write buffer 104. For a normal write operation an arbiter determines that it is time to issue a write command. The arbiter selects the write buffer 104 for a write operation and the write data 126 is provided to the multiplexer (MUX) 110 on a communication channel 118. Then the MUX 110 sends the write data 126 on a bus 120 to the XIO 102. From there the XIO 102 writes the data into the DRAMs.

This modified RMW operation is handled completely differently by the XDR™ memory system. First, the memory controller 130 receives a write command 124 that is smaller in length than a cacheline. Then, the memory controller 130 issues a read command to the XIO 102. The XIO 102 reads the target data from the DRAM, which is a cacheline in length. This data is sent on a bus 112 to the RMW buffer 106, where it is stored. Independently, the write data 126 requested by the write command 124 travels on a bus 122 and is stored in the write buffer 104. Subsequently, an arbiter determines that it is time to issue a write command and selects the write buffer 104 and the RMW buffer 106 for a RMW. At this time the data from the write buffer 104 is sent on a communication channel 118 to the MUX 110, and the data from the RMW buffer 106 is sent on a communication channel 116 to the MUX 110. The MUX 110 merges the data together to form a full cacheline of data. The merged data is sent on bus 120 to the XIO 102. The XIO 102 writes the merged data to the target DRAM. This process insures that the rest of the data is unmodified.

This modified RMW method is more efficient for XDR™ memory systems than a conventional RMW operation because there is no delay due to the dataflow time. The reads can be executed by the XIO 102 and stored in the RMW buffer 106. The read data values can be kept in the RMW buffer until the XDR™ and the arbiter are ready to do a write. This means that the read operations and the write operations of a RMW are handled separately. Therefore, other commands can be handled in between the read and the write of the RMW, which means that dataflow delay time is not a penalty.

Figure 2:
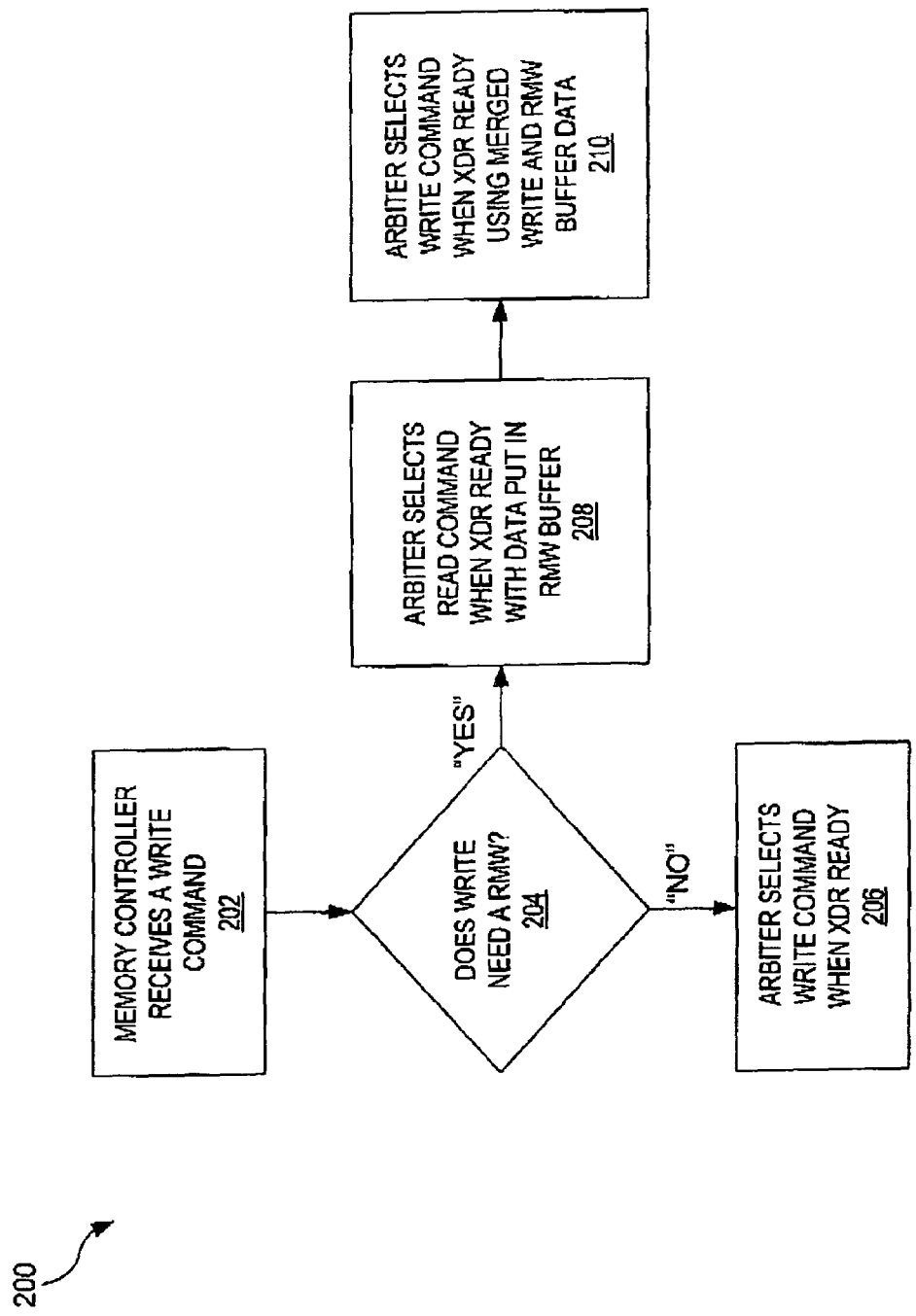
FIG. 2 is a flow chart illustrating the modified RMW process in an XDR™ memory system.

Referring to FIG. 2 of the drawings, reference numeral 200 generally designates a flow chart illustrating the modified RMW process in an XDR™ memory system. The process begins with the memory controller receiving a write command 202. Then the memory controller determines whether the write needs a RMW 204. As previously described, the write operation needs a RMW if the write is smaller than a cacheline in length. If the write does not need a RMW, then the arbiter selects a write command when the XDR™ system is ready 206. If the write does need a RMW, then the arbiter selects a read command when the XDR™ system is ready 208. The data from the read is stored in the RMW buffer 208. Subsequently, the arbiter selects a write command using the merged data from the RMW buffer and the write buffer 210. The end result is that the merged data is written into the target DRAM.

Figure 3:
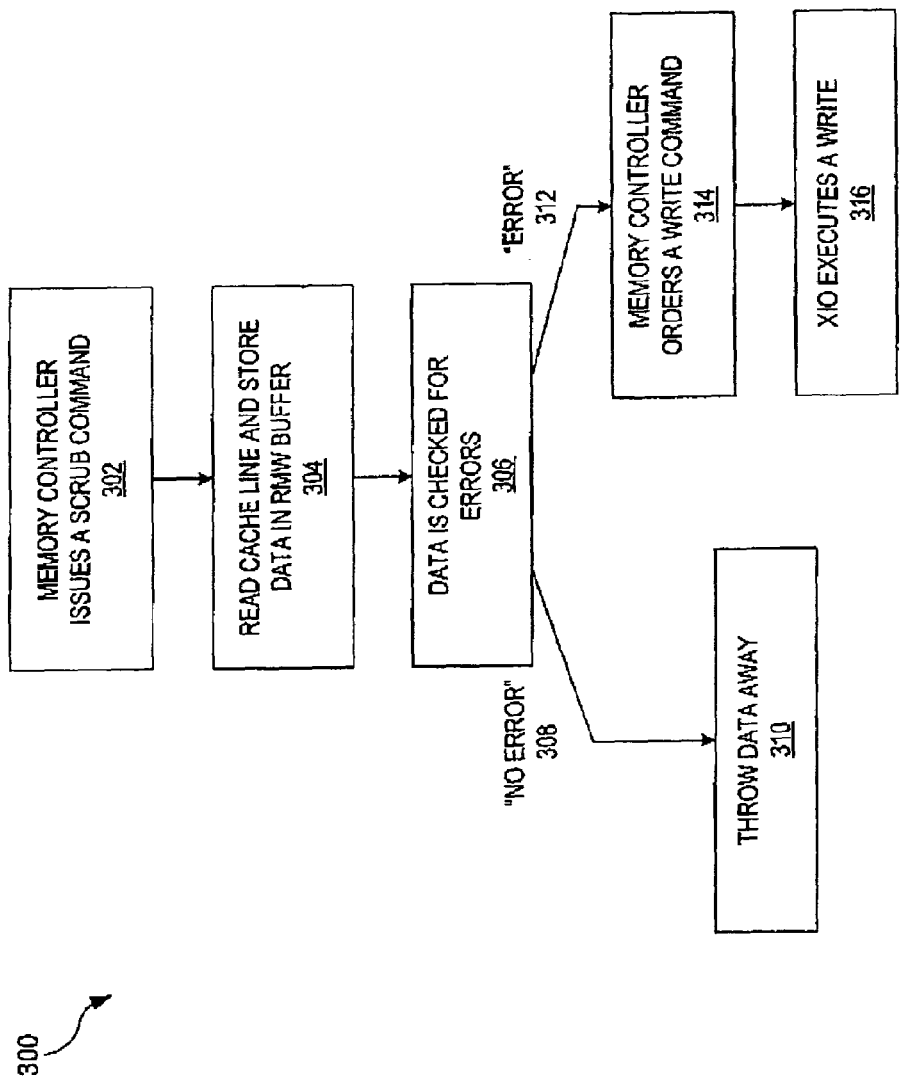
FIG. 3 is a flow chart illustrating the scrub process in an XDR™ memory system that uses a RMW buffer.

The RMW buffer 108 is also advantageous for scrubbing. Scrubbing is the process of reading data values in memory arrays to look for ECC bit errors. Referring to FIG. 3 of the drawings, reference numeral 300 generally designates a flow chart illustrating the scrub process in an XDR™ memory system. The first step in the process consists of the memory controller issuing a scrub command 302. Then the XIO reads a cacheline from the DRAMs and stores the data value in the RMW buffer 304. Subsequently, this data from the RMW buffer is checked for errors 306. If there is no error 308 then the data is thrown away 310. If there is an error 312 then the memory controller orders a write command 314. Lastly, the XIO executes a write command to correct the data value 316 of the specific DRAM. The scrub process differs from the RMW process in that the data from the write buffer is not merged with the data from the RMW buffer in the scrub process.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for handling read and write operations of Read-Modify-Write (RMW) commands in a memory system containing a plurality of Extreme Data Rate (XDR) Dynamic Random Access Memories (DRAMs), comprising:
   storing write operation data in a write buffer, wherein the write operation data is less than a cacheline of data in length;
   performing a read operation;
   storing read operation data in a RMW buffer, wherein the read operation data is at least one cacheline of data in length;
   merging the read operation data and the write operation data to form a full cacheline of data;
   storing the merged data in at least one of the plurality of XDR DRAMs; and
   executing at least one of a read command or a write command in the time between performing the read operation and the storing of the merged data in the at least one of the plurality of XDR DRAMs.

2. The method of claim 1, wherein performing the read operation, further comprises receiving the at least one cacheline of data from at least one of the plurality of XDR DRAMs.

* * * * *